March 31, 1970    A. DIXON ETAL    3,504,149
BRAZING METHOD
Filed Nov. 29, 1967

INVENTORS
Austin Dixon and
Stanley J. Frohlich
BY
D.J. Stratcliff
AGENT 3,504,149
BRAZING METHOD
Austin Dixon, Manor, and Stanley J. Frohlich, Pittsburgh, Pa., assignors to Westinghouse Electric Corporation, Pittsburgh, Pa., a corporation of Pennsylvania
Filed Nov. 29, 1967, Ser. No. 686,621
Int. Cl. B23k 13/00
U.S. Cl. 219—9.5          6 Claims

ABSTRACT OF THE DISCLOSURE

An improved method suited for induction brazing a hardened copper alloy workpiece member to a second refractory metal workpiece member, or other difficult-to-braze metals, wherein: an elongated sandwich assemblage of workpiece members and a preform brazing alloy layer member is induction heated uniformly and simultaneously throughout its length to the fusion temperature of the brazing alloy and to momentarily maintain such temperature as required for diffusion of the molten brazing alloy layer while a considerable squeezing force on the assemblage is delivered by the members to such brazing alloy layer; the rate and degree of induction heating of the assemblage are regulated automatically in response to radiation from an emissivity-stabilized surface of such assemblage to reduce the time required to heat the assemblage to brazing temperature to a matter of seconds while preventing overheating above such temperature; and termination of heat application and forced air cooling of such assemblage for reduction of its temperature is effected automatically within one minute after initiation of its heating.

BACKGROUND OF THE INVENTION

Field of the invention

Brazing by use of induction heating and squeezing force at the joint.

Description of the prior art

High strength induction brazing of workpiece members such as hardened chrome-copper alloy contact support members used in power circuit breakers to other members, such as arc-resisting tips made of refractory metal such as tungsten-bearing material, without void loss in bonded area in excess of ten percent of the available joining surface of the workpiece members, and/or intolerable loss in degree of hardness of the hardened member, is difficult to obtain. In brazing such power circuit breaker members, a common practice has been to heat the members locally in the region of the joint by a single-turn induction coil encircling such members in the plane of the brazing alloy layer for its fusion. The operator controls the energy supplied to the heating coil according to his visual observation of its heating effect on the members at the joint and manually effects sliding manipulation of the tungsten-bearing contact member across the face of the age-hardened member when the brazing alloy is flowable, in effort to displace gas bubbles from the joint and obtain uniform distribution and wetting of the members by such alloy, after which he holds the contact member in place manually as the brazing alloy is allowed to solidify. The obtaining of a uniformly bonded joint without undue voids, and/or undue loss in hardness property of certain age hardened chrome copper members by this method, has required an operator of exceptional ability and considerable experience.

SUMMARY

In accord with the present invention, the induction method of brazing such non-ferrous hardened workpiece members to refractory metal workpiece members has been improved by inducing heating currents in the workpiece assemblage, including the two parts and the brazing alloy layer at the joint, uniformly and simultaneously throughout the length of such assemblage, rather than only in the vicinity of the joint as per common practice. This eliminates a tendency for overheating in the localized region of heating currents at the joint induced by the single turn coil which results from attempting to bring such region up to a desired temperature while heat is rapidly flowing by conduction to the remainder of the workpiece assemblage, and provides a temperature uniformity throughout the assemblage length which facilitates pyrometric observation of the workpiece for purposes of automatically controlling temperature at the braze joint without need for direct observation of such joint. The improved method further includes the applying of a predetermined squeezing force between the workpiece members and an intermediate preform brazing alloy layer member during heating of the assemblage which accomplishes the bubble-removal and workpiece-wetting functions of the previous sliding manipulation step with a greater degree of simplicity, success, and attainability. In addition, the brazing alloy layer is significantly reduced in thickness at least fifty percent, while molten and being so squeezed, to an ultimate thickness of about one mil, which degree of reduction in thickness was not obtained by the previous sliding manipulation technique and attributes to a stronger joint of greater bonded void-free area than heretofore obtained. Still further, the improved method automatically controls the induction heating of the assemblage responsively to radiation from an emissivity-stabilized region of the workpiece assemblage to raise its temperature to a precise value in minimal time, and effects termination of heating and initiation of forced air cooling of the assemblage to a brazing-alloy-solidifying temperature, which also can be a significantly-reduced-softening-rate temperature for an age-hardened member, within one minute after first introducing heat, thereby assuring adequate temperature for the improved brazing alloy fusion while minimizing any adverse softening effects time and temperatures may have on a particular hardened member or members of the workpiece assemblage.

DESCRIPTION OF THE PREFERRED EMBODIMENT

Figure 1:
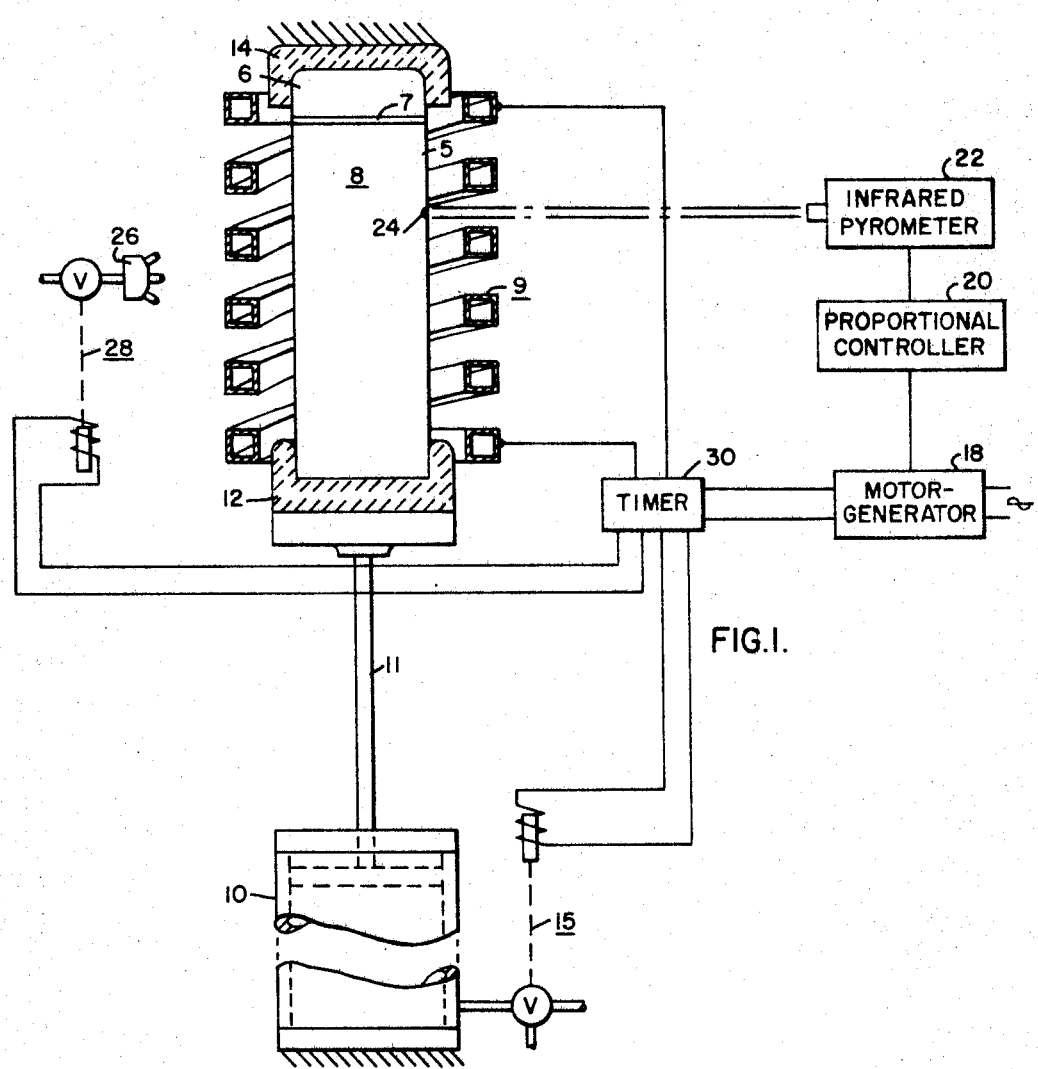
FIGURE 1 is a schematic representation of apparatus suitable for performing the novel method of the present invention.

Referring to FIG. 1, in a more specific aspect of this invention, it now has been discovered that highly satisfactory brazing of a non-ferous workpiece member 5 of such as age hardened chrome and beryllium copper alloys, aluminum and aluminum alloys, nickel base alloys, or the like to another difficult-to-braze workpiece member 6 of refractory metal such as silver-tungsten, copper-tungsten, or the like, can be effected with minimal void area and without excessive loss in hardness property of the workpiece member 5 or members 5 and 6 when of hardened material by utilization of the following method.

Assuming that at least the surfaces of the workpiece members 5 and 6 and of preform brazing alloy layer member 7 to be joined by brazing are susceptible of being disposed parallel to one another over the entirety of such area to within three mils and will have been cleaned, as by subjection to an acid bath, a thin layer of a suitable brazing flux (not shown) is first applied to such surfaces, preferably by spraying, and these members are then assembled with the preform brazing alloy layer member 7 sandwiched between the two workpiece members 5 and 6. Such workpiece assemblage 8 is then introduced to a water-cooled induction heating coil means 9, for electromagnetic coupling therewith substantially in its entirety, as by insertion into the interior of an elongated vertical multi-turn helical induction coil, as exemplified. Concurrently with or subsequently to such introduction, a force is applied to the assemblage 8 in a manner and degree sufficient to exert a squeezing force in excess of fifty p.s.i. on the preform brazing alloy layer member 7 by the contiguous parallel joining surfaces of the workpiece members 5 and 6.

This can be accomplished for example by use of a vertically-arranged fluid pressure actuating cylinder 10, as exemplified, coupled by a piston rod 11 to an insulated bottom support member 12 for the workpiece assemblage and an insulated fixed stop member 14 blocking the upper end of the helical induction coil 9. By placing the lower end of assemblage 8 onto support member 12 while the cylinder 10 is retracted, pressurization of such cylinder will raise such assemblage into induction heat coil 9 until the upper end of the assemblage comes into abutment with the stop member 14, whereafter continued cylinder pressurization causes exertion of a squeeze force at top and bottom of the assemblage 8 between the members 12 and 14, which is transmitted to the preform brazing alloy layer member 7 between the workpiece members 5 and 6. It will be noted that such force is steady, is delivered perpendicularly to such layer 7, and does not introduce any transverse sliding movement thereof; such layer merely tends to stay in place, aligned with the adjacent workpiece members. A valve 15 can serve to control supply and release of operating fluid under pressure to and from the cylinder 10 for upward and downward actuation of member 12, respectively.

Following such introduction of workpiece assemblage 8 into the induction heating coil means 9, and while the prescribed squeeze force is maintained, rapid heating of such assemblage in its entirety up to a preselected temperature value in a matter of seconds is effected by energization of such coil means, as by ten kilohertz energy from such as a fifty to one-hundred-fifty kilowatt motor-generator 18, under regulation by a proportional controller 20 responsive to dictates of an infrared pyrometer means 22 in observance of an emissivity-stabilized area of the outer surface of the inductively-heated workpiece assemblage 8. Precisely upon attainment of such preselected temperature value, as determined by the set point of controller 20 and output from the infrared pyrometer 22, the workpiece temperature is held at such value for another number of seconds, after which heating of the assemblage 8 is terminated by deenergization of the heating coil 9 and rapid forced air cooling of such assemblage, down to a decelerated softness inducing temperature for an age hardened member 5, and to below the solidifying temperature for the brazing alloy layer 7 is simultaneously effectuated, as through operation of forced air jet means 26 controlled via a solenoid valve means 28 by a timer 30 which also controls deenergization of induction heating coil means 9.

Figure 2:
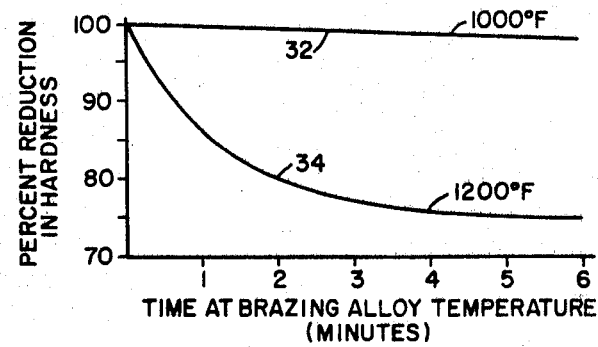
FIG. 2 is a graph showing the softening influence of time and temperature on an age-hardened copper chrome alloy material.

The rate at which an age hardened alloy, such as chrome-copper alloys employed as tip support members in power circuit breakers, loses its hardness depends upon its temperature and the time it is at such temperature. In accord with one aspect of this invention, it has been discovered that at temperatures in the region of the fusion points of lesser expensive brazing-alloys suitable for joining a refractory metal member such as a silver-tungsten tip member 6 to such chrome-copper tip support member 5, this softening rate varies exponentially in inverse proportion to the time such a support is held at these brazing alloy temperatures, with the predominant rates occurring within the first several minutes, as exemplified by the curve 34 in FIG. 2 for a typical chrome-copper alloy of 0.4 to 1.0% chromium at 1200° F., a temperature suitable for fusion of a suitable silver brazing alloy having a composition: silver 43–45%, copper 26–28%, zinc 11–15%, cadmium 14–16%, and phosphorus 0.8–1.2% sold under the trade name "Mallory 5" and "Handy & Harmon 440." Accordingly, in order to significantly reduce the softening influence of brazing temperature experienced by the hardened member 5, it becomes necessary to minimize the time at which such member is exposed to such brazing temperature commensurate with the goal of obtaining a high quality brazed joint. Accordingly, the entire workpiece assemblage 8 is heated up to brazing temperature within a small fraction of a minute, twenty seconds, for example, is held at the brazing temperature for another fraction of a minute, another twenty seconds, for example, and quickly forced-air cooled within several more seconds, ten seconds, for example, down to a greatly-decelerated softness-inducing temperature which may be only several hundred degrees less than the fusion temperature of the brazing alloy, such as down to 1000° F., which for a typical age-hardened chrome-copper alloy material has such decelerated time-temperature softening characteristics as shown in curve 32, FIG. 2. Thus by limiting the time at which the age-hardened member is at the fusion temperature of the brazing alloy material to a small fraction of a minute, the hardness of such member can be maintained at better than 80% of its original hardness, and by the raising of the assemblage 8 up to such fusion temperature also in a small fraction of a minute, initiation of melting of the preform brazing alloy layer member 7 is expedited to provide efficiency in overall performance of the method.

In assurance of the obtaining of a high quality braze joint, it has been found that the braze alloy layer member 7 should be preformed as a thin sheet-like member covering the entire areas of the workpiece surfaces intended to be bonded and the squeeze force delivered to the assemblage should be in excess of fifty pounds per square inch relative to the cross sectional area of the workpiece surfaces abutting the brazing alloy layer, and preferably above seventy-five p.s.i. The brazing alloy layer member 7 initially may be in the order of several mils thick, and during subjection to the heat and pressure of the present method will become reduced in thickness to about one mil, which reduction appears to have a strengthening effect on the ultimate joint; bonded areas in excess of 90% are readily obtained, as measured by micro-examination of transverse sections through the braze joint. However, at pressures above seventy-five p.s.i., for example, it appears that little, if any, further advantage is derived. The force required may vary somewhat according to the viscosity, flow, and wetting properties of the fused brazing alloy, but for the afore-exemplified silver brazing alloy for joining a chrome-copper workpiece member to a silver-tungsten member, a force of seventy-five p.s.i. has been found suitable.

It should be emphasized that the above joint squeezing force should be applied at least during the time that the preform bsazing alloy layer member 7 is in its molten or fused state and should continue until after it has been cooled sufficiently to re-solidify, which will have been readily obtained during rapid cooling of the assemblage 8 to the aforementioned reduced-softening-rate temperature of merely several hundred degrees less than the maximum temperature experienced by the workpiece assemblage, so long as such maximum temperature is not permitted to exceed the liquidus temperature of the brazing alloy material excessively. Following such effective cooling of the workpiece assemblage 8, the squeeze force may be relaxed and the then-brazed assemblage 8 removed from the heating coil means 9, as by lowering-retraction of support member 12, and then removed from such member 12 for further cooling to room temperature.

The total time that the workpiece assemblage 8 need be present in the apparatus for performing the novel method of the present invention need be no longer than about one minute, presuming the apparatus to be adequately qualified.

To simplify the procedure of obtaining temperature information from the workpiece assemblage for employment of the method on a production basis, while preserving a high degree of accuracy, the small surface area 24 of the workpiece assemblage 8, such as on member 5, for example, which is emissivity-stabilized can be so stabilized by spray coating with a suitable high temperature paint, such as Pyromark No. 71943, Type H, manufactured by the Tempil Corporation. This particular paint is suitable for a range of brazing temperatures at least to and including 1200° F., and possibly above.

Also in behalf of optimizing use of the apparatus, an adjunctive feature includes automatic unloading of the workpiece assemblage 8 within a matter of seconds after initiation of forced cooling by the nozzle means 26. This can be effected, as exemplified in FIG. 1, by employing a solenoid-operated valve device as the valve means 15 under control of such as the timer means 30 to automatically retract cylinder 10 downwardly coincidentally to attainment of prescribed forced-gas cooling. Upon such removal of the partially cooled assemblage 8, it may be transferred to a water quench tank for rapid cooling with the usual beneficial side-effect of oxide-flash-off cleaning action.

During development of the present method, electroplating of a tungsten-silver workpiece member 6 with different metals including copper, nickel, platinum and silver was evaluated for possible utility and was found to detract from the strength of the brazed joint compared to that obtainable without such plating in accord with such method which has afforded a shear strength averaging about 25,000 p.s.i.

We claim as our invention:

1. An improved induction brazing method for joining a workpiece member of hardened non-ferrous metal to a second metal workpiece member, which improvement comprises subjecting a sandwich workpiece assemblage of the hardened workpiece member, the second metal workpiece member and an intermediate layer member of brazing alloy to an induction heating effect simultaneously throughout the length of such assemblage, controlling the induction heating of such assemblage automatically in response to pyrometric observation of an emissivity-stabilized surface area of the assemblage to raise its temperature to a braze-effecting temperature in slight excess of the liquidus threshold temperature of the brazing alloy layer and to maintain such braze-effecting temperature, automatically terminating application of such induction heating and effecting forced gas cooling of such assemblage to a reduced temperature for hardening the brazing alloy layer within thirty seconds after obtainment of the braze-effecting temperature, and applying a steady squeeze force between the workpiece members and the brazing alloy layer at least during the time the assemblage is at braze-effecting temperature and subsequently being subjected to the aforesaid forced gas cooling.

2. The improved induction brazing method of claim 1, wherein the one workpiece member is of hardened chrome-copper alloy and the second metal workpiece member is of refractory metal, the brazing alloy layer has liquidus and solidus temperatures in the vicinity of 1200° F., the braze-effecting temperature employed is within fifty degrees above the liquidus temperature of the brazing alloy layer, and the reduced temperature to which the assemblage is forced-gas cooled is below 1100° F.

3. The improved induction brazing method of claim 2, wherein the refractory metal member is a non-plated silver-tungsten refractory metal; the brazing alloy layer member is a silver alloy material substantially composed of silver 43–45%, copper 26–28%, zinc 11–15%, cadmium 14–16% and phosphorus 0.8–1.2%; and the reduced temperature is 1000° F. or below.

4. The improved induction brazing method of claim 1, wherein the workpiece assemblage is heated up to the braze-effecting temperature within less than twenty seconds after initiation of its induction heating.

5. The improved induction brazing method of claim 3, wherein the workpiece assemblage is heated up to the braze-effecting temperature within twenty seconds after initiation of its induction heating.

6. The improved induction brazing method of claim 1, wherein the aforesaid squeeze force is of sufficient magniture to reduce the brazing alloy layer thickness by at least fifty percent of its original thickness.

References Cited

UNITED STATES PATENTS

| | | | |
|---|---|---|---|
| 2,480,351 | 8/1949 | Anderson | 219—85 |
| 2,649,527 | 8/1953 | Chapman et al. | 219—9.5 |
| 2,710,901 | 6/1955 | Ireland | 219—9.5 |
| 2,762,892 | 9/1956 | Park | 219—9.5 |

JOSEPH V. TRUHE, Primary Examiner

H. D. JAEGER, Assistant Examiner

U.S. Cl. X.R.

219—85